Aug. 23, 1949.                  B. H. IVES                    2,479,839
                                 HANGER
Filed April 8, 1946                                      2 Sheets-Sheet 1
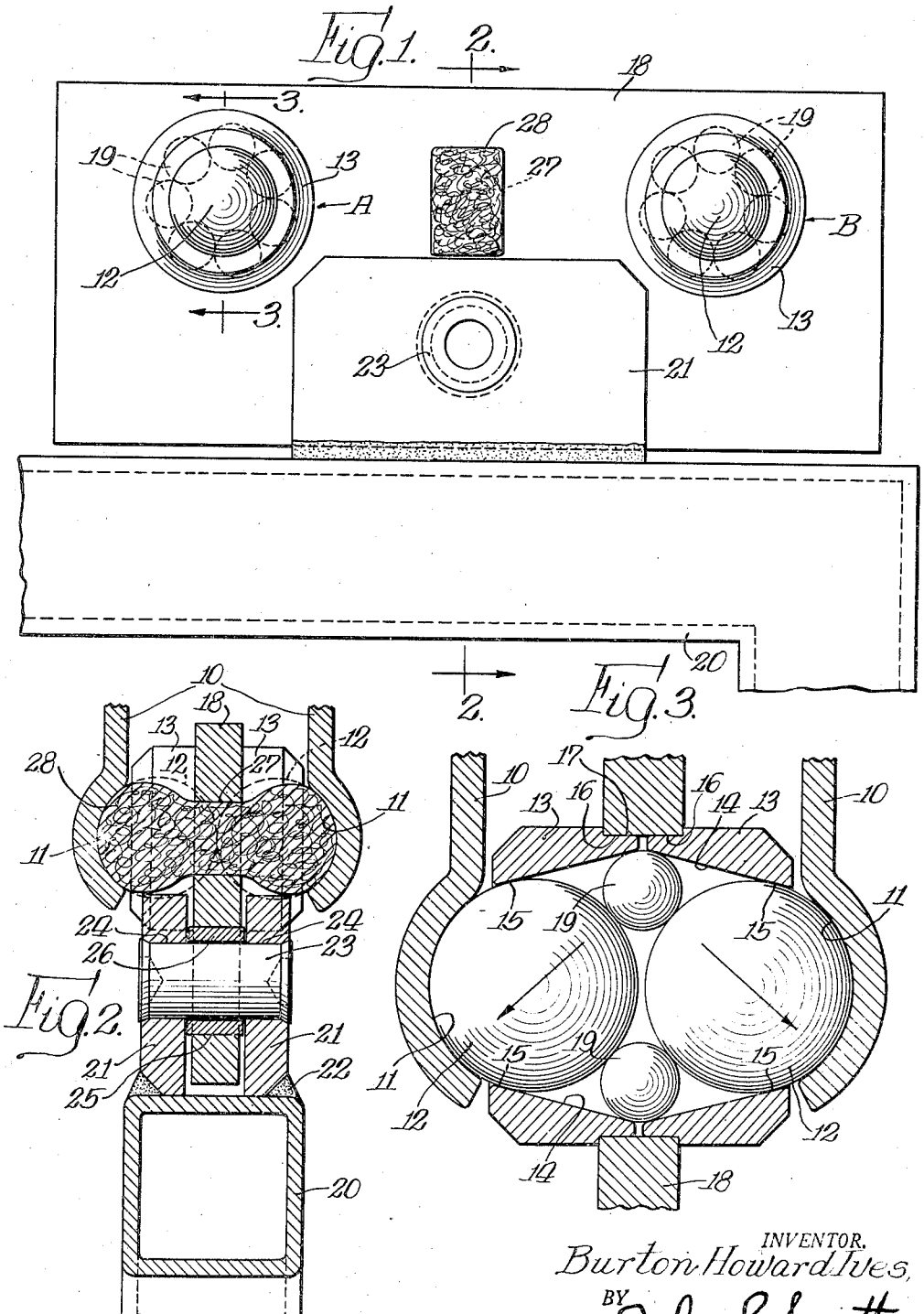
INVENTOR.
Burton Howard Ives,
BY John P. Smith
            Atty.

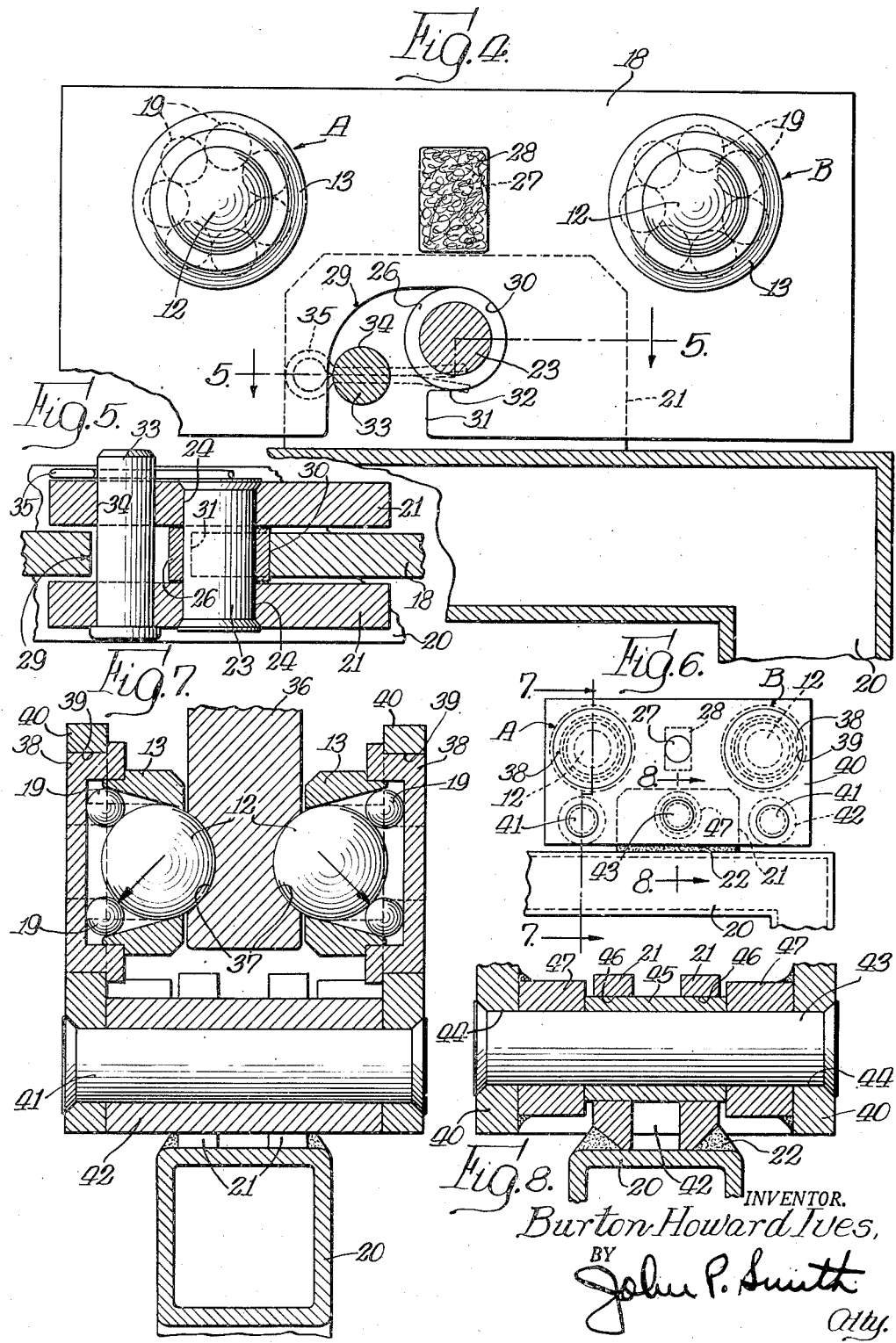

Patented Aug. 23, 1949

2,479,839

UNITED STATES PATENT OFFICE 2,479,839

HANGER

Burton Howard Ives, Chicago, Ill., assignor to Rockford Automotive Industries, Inc., De Kalb, Ill., a corporation of Illinois Application April 8, 1946, Serial No. 660,371

8 Claims. (Cl. 16—88)

The present invention relates generally to a door hanger and the like, but more particularly to a novel and improved anti-friction hanger of the ball bearing type whereby the inner ball race is conical in shape and the outer ball race is an elongated, substantially straight member. My improved hanger has a special adaptation for such purposes as door appliances on motor trucks, motor buses, garages, street cars or may be employed in connection with a drawer, tray, shelf or other equipment such as a conveyor system for material handling and the like.

One of the primary objects of the present invention is to provide a simple, efficient hanger and flexible mounting therefor, whereby the bearings and bearing races are so arranged that the load is properly distributed on the balls and raceways to more efficiently secure a freely rolling contact between the balls and raceways.

A still further object of the invention is to provide a novel and improved hanger construction of ball bearings and bearing race type whereby the thrust loading is directed from one ball to another in a manner which increases the free rotation of the anti-friction members when the pressure is applied.

A still further object of the invention is to provide a novel and improved hanger arrangement of ball bearings and bearing races whereby the ball rotations and contacts along the longitudinal raceways are transferred to a series of smaller balls in such a manner as to cause the smaller balls to rotate between the peripheries of the larger balls and the conical raceways.

A still further object of the invention is to provide a novel and improved hanger construction of ball bearings and bearing races, whereby the ball rotation and contact along the longitudinal raceway is supported and balanced by a series of smaller balls to maintain an equalized relation between the balls and ball races, all of which lends itself toward the greatest anti-friction quality of the hanger.

A further object of the invention is to provide a novel and improved hanger in which different sizes of balls, in combination with conical shaped raceways and longitudinally extending raceways of arcuate cross section, provide an assembly which eliminates all friction.

These and other objects are accomplished by providing a construction and an arrangement of the various parts in the manner hereinafter described and particularly pointed out in the appended claims.

Referring to the drawings:

Fig. 1 is an enlarged side elevational view of my improved hanger;

Fig. 2 is a cross sectional view taken on the line 2—2 in Fig. 1;

Fig. 3 is an enlarged cross sectional view taken on the line 3—3 in Fig. 1;

Fig. 4 is a longitudinal cross sectional view of a slightly modified form of the hanger shown in Fig. 1;

Fig. 5 is a cross sectional view taken on the line 5—5 in Fig. 4;

Fig. 6 is a side elevational view of another modified form in which a longitudinally extending inner race member is employed;

Fig. 7 is an enlarged cross sectional view taken on the line 7—7 in Fig. 6; and

Fig. 8 is an enlarged cross sectional view taken on the line 8—8 in Fig. 6.

In illustrating the preferred form of my invention, I have shown the same embodied in a sliding door construction, but it will, of course, be understood that the important features embodied herein are capable of a variety of uses hereinbefore pointed out.

In the drawings, particularly Figs. 1, 2 and 3, longitudinally extending and horizontally disposed spaced apart raceway members 10 are supported from a super-structure in any conventional manner. The members 10 in this instance may be a single channel member if so desired. The lower portion of each of these members are arcuately curved in cross section throughout their length as shown at 11 so that the curved surfaces of each of the members 10 form the longitudinal raceways for the respective large bearing balls 12. Two large bearing balls 12 in each set, as indicated at A and B, are mounted in oppositely disposed annular race rings 13. The race rings 13 are provided with conically shaped or beveled bores 14. The bores in these race rings 13 are of such a diameter as to permit a substantial portion of the periphery of each of the large balls 12 to protrude therefrom so as to contact or ride on the arcuate portion 11 of each of the oppositely disposed longitudinally extending raceways 10. In this connection it will be noted that the oppositely disposed bearing balls 12 contact or ride adjacent the smaller diameter of the rings 13 as shown at 15 of the tapered bores 14. The inner portions of each of these race rings 13 are provided with annular recesses as shown at 16 so that they may be press fitted or otherwise secured in an aperture 17 on the opposite sides of a supporting member or plate 18. Positioned between the large bearing balls 12 and adjacent the larger diameter of the conically shaped bores 14 of the respective race rings 13, are a plurality of annularly arranged and relatively smaller bearing balls 19. In this construction it will be observed by referring to Fig. 3 of the drawings that the annularly arranged relatively smaller bearing balls 19 not only hold the larger bearing balls 12 in contact with respect to their respective raceways, but also hold each of the larger bearing balls in spaced relation with respect to one another so that when the load is suspended on the supporting plate 18, the direction of thrust on the anti-friction member is borne in the direction indicated by the arrow in Fig. 3 of the drawings and thereby reduces the friction to a minimum to provide an exceptionally freely and easily movable hanger support.

The sliding member or door frame in this instance is indicated by the reference character 20 and comprises a metal frame member of a hollow square cross section which has attached on the upper edge thereof spaced apart hanger brackets 21 which have their lower ends secured by welding 22 or otherwise to the top of the frame member 20. These brackets 21 are secured to the center of the retainer plate 18 between the two anti-friction assemblies A and B by a pin 23 which extends through suitable aligned apertures 24 in each of the brackets 21 and through an aperture 25 in the plate 18. Mounted in the apertures 25 of the supporting plate 18 is spacer sleeve 26 through which the pin 23 extends. The sleeve 26 is of sufficient width so as to provide clearance for the plate 18, as clearly shown in Fig. 2 of the drawings. Positioned in a suitable aperture 27 in the supporting member 18 is a felt wiper or cleaner 28 which projects outwardly with respect to the member 18 so as to contact the raceway surface 11 of each of the longitudinal tracks 10 as clearly shown in Fig. 2 of the drawings.

In Figs. 4 and 5 of the drawings, I have shown a slightly modified form of my invention, as shown in Figs. 1 to 3 inclusive, so as to make the door more easily detachable from the anti-friction assembly of the hanger without the necessity of removing the anti-friction assembly from the longitudinal track when the door is removed or for attaching the door to the hanger proper when the anti-friction assembly is mounted on the track. In this modified form, the supporting member 18 is provided with a substantially inverted L-shaped slot, generally indicated by the reference character 29, which extends upwardly and opens at the lower edge of the member 18 and thence laterally to a point substantially in the longitudinal center thereof to form a semicircular recess as shown at 30. Adjacent the semi-circular slot 30 is a longitudinally extending projection 31, the upper edge of which, as shown at 32, forms the support for the spacer sleeve 26 and pin 23 for sustaining the weight of the door. From the above it will be obvious that the sleeve 26 and the pin 23 may be easily attached to or detached from the member 18 through the medium of the inverted L-shaped slot 29. In order to secure the parts in position, a second pin 33 may be inserted in aligned apertures 34 in the opposite brackets 21 so as to lock or prevent displacement of the pin 23 and the sleeve 26 from the semi-circular recess 30. The pin 33 is secured in position by the usual cotter pin 35. From the above description it will be obvious that the modification shown in Figs. 4 and 5 of the drawings, permits the attachment or removal of the door from the retainer plate assembly without removing the assembly from the longitudinal raceways 10.

In the modified form of my invention shown in Figs. 6, 7 and 8 of the drawings, I have provided an arrangement in which the longitudinal track or raceway is located between the two large bearing balls 12. With this arrangement, two sets of annularly arranged relatively smaller bearing balls 19 are positioned with each of the respective larger bearings balls so that the weight sustained by these anti-friction members is such that it provides a very efficient and freely moving frictionless hanger. In these figures the parts which are common to all forms of the invention disclosed in this application carry the same reference numerals. This modified form includes a longitudinally extending rail member or track 36 which is provided with oppositely disposed arcuately formed and longitudinally extending raceways 37 in which are adapted to travel the two oppositely disposed bearing balls 12. The balls 12 are mounted in the rings 13 similar to that shown in Figs. 1, 2 and 3 of the drawings. The rings 13 are press-fitted into adapters or circular members 38 which, in turn, are mounted in aligned apertures 39 formed in the oppositely positioned supporting frame members 40. The members 40 are secured together by spaced apart pins 41 and held in spaced relation with respect to one another by spacer sleeves 42. (See Figs. 6 and 7 of the drawings.) The door is suspended from the hanger proper by the spaced apart brackets 21 by means of a pin 43 extending through aligned apertures 44 to the opposite supporting members 40. A spacer sleeve 45 is mounted on the central portion of the pin 43 and extends through aligned apertures 46 in each of the aligned hanger brackets 21. (See Fig. 8 of the drawings.) Inwardly extending bosses 47 are welded to the inner surfaces of each of the opposite supporting members 40 so that their inner shoulders abut the ends of the sleeve 45 and afford sufficient clearance for the spaced apart hanger bracket 21.

In the modified form of my invention, as shown in Figs. 6, 7 and 8 of the drawings, the direction of the thrust on the anti-friction bearing members or balls is exerted in a direction indicated by the arrow in Fig. 7 of the drawings so that the function and operation of these respective parts are substantially identical with that shown in Figs. 1, 2 and 3 of the drawings. The modified form shown in Figs. 6, 7 and 8 is preferably for certain applications where such change of construction is required.

Summarizing the advantages and function of operation of my improved type of hanger, it will be readily seen that I have provided a very simple, compact and efficient hanger of the ball bearing type and one which incorporates a new method of ball bearing mounting wherein the thrust load is sustained directly by the bearing balls in a direction towards the respective raceways, to thereby permit the balls to freely rotate with a minimum of friction on the movement of the hanger as a whole. It is further pointed out that both of these forms of anti-friction mountings are so constructed and arranged to equalize the load on the bearing raceways so as to decrease the roller friction in proportion to the load increase.

While in the above specification I have described one preferred embodiment and a modification of the same which my invention may assume in practice, it will, of course, be understood that the same is capable of modification and that modification may be made without departing from the spirit and scope of the invention as expressed in the following claims.

What I claim as my invention and desire to secure by Letters Patent is:

1. A hanger supporting member, a plurality of different sizes of bearing balls including relatively large balls and relatively small balls carried by said supporting member, and oppositely disposed retainer rings carried by said supporting member and having conically shaped bores therein forming raceways for said balls, all of said balls engageable with the conically shaped bores of said rings.

2. A hanger comprising a supporting member, a plurality of different sizes of bearing balls including relatively large balls and relatively small balls carried by said supporting member, and oppositely disposed retainer rings carried by said supporting member and having conically shaped bores therein forming raceways for said balls, certain of said balls being arranged annularly of and between certain other of said balls.

3. A hanger comprising a supporting plate, relatively large balls located adjacent the opposite sides of said plate and portions of their surface projecting outwardly from said plate, means secured to said plate for retaining said balls in said plate, relatively smaller bearing balls mounted in said plate and supported therein by said means.

4. A hanger comprising a supporting member, relatively large bearing balls projecting laterally from said member, a plurality of annularly arranged and relatively smaller bearing balls mounted between and engaging said larger balls, and retainer members secured to said member and engageable with both sizes of balls for retaining said balls in operative position.

5. A hanger comprising a supporting member, relatively large bearing balls projecting laterally from said member, a plurality of annularly arranged and relatively smaller bearing balls mounted between and engaging said larger balls, and oppositely disposed retainer rings secured to said member having tapered raceways therein for engaging said large and small bearing balls for retaining all of said balls in operative position with respect to one another.

6. A hanger comprising a supporting member, relatively large bearing balls projecting laterally from said member, a plurality of annularly arranged and relatively smaller bearing balls mounted between and engaging said larger balls, and oppositely disposed retainer rings secured to and projecting outwardly from said member, said retainer rings having conically shaped raceways therein engageable with said large and small bearing balls for retaining all of said balls in operative relation.

7. A hanger comprising a supporting member, relatively large bearing balls projecting laterally from said member, a plurality of annularly arranged and relatively smaller bearing balls mounted between and engaging said larger balls, and oppositely disposed retainer rings for all of said balls secured to and projecting outwardly from said member, said retainer rings having conically shaped raceways formed therein with the larger diameters of the raceways of said rings positioned adjacent one another.

8. A hanger comprising a supporting member, two relatively large and laterally spaced apart bearing balls carried by said member, the longitudinal center plane of said supporting member located between said large balls, relatively smaller bearing balls arranged annularly between said large balls for holding said large balls in spaced apart position, and retainer rings secured to said supporting member and engageable with all of said balls for retaining all of said balls in operative position.

BURTON HOWARD IVES.

REFERENCES CITED

The following references are of record in the file of this patent:

UNITED STATES PATENTS

| Number | Name | Date |
| --- | --- | --- |
| 633,808 | Climer | Sept. 26, 1899 |
| 1,005,860 | Mann | Oct. 17, 1911 |
| 1,271,113 | Armband | July 2, 1918 |
| 1,414,630 | Dowald | May 2, 1922 |
| 1,582,795 | Smith | Apr. 27, 1926 |

FOREIGN PATENTS

| Number | Country | Date |
| --- | --- | --- |
| 105,267 | Sweden | Aug. 18, 1942 |